United States Patent
Tanaka et al.

(10) Patent No.: US 7,679,671 B2
(45) Date of Patent: Mar. 16, 2010

(54) IMAGE CAPTURING FOR CAPTURING AN IMAGE OF AN OBJECT BY ILLUMINATING THE OBJECT AND RECEIVING LIGHT FROM THE OBJECT

(75) Inventors: Hiroyuki Tanaka, Inagi (JP); Yoshio Yoshizu, Inagi (JP); Takashi Yoshida, Inagi (JP); Kouichi Matsuo, Inagi (JP); Isao Iwaguchi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 679 days.

(21) Appl. No.: 11/591,551

(22) Filed: Nov. 2, 2006

(65) Prior Publication Data

US 2007/0206114 A1    Sep. 6, 2007

(30) Foreign Application Priority Data

Mar. 3, 2006    (JP)    .............................. 2006-058086

(51) Int. Cl.
*H04N 5/222*    (2006.01)
(52) U.S. Cl. ...................................... 348/370; 348/374
(58) Field of Classification Search ................. 348/371, 348/374, 370; 235/462.24, 462.42; 382/127, 382/115
See application file for complete search history.

(56) References Cited

U.S. PATENT DOCUMENTS

| | | | | |
|---|---|---|---|---|
| 3,442,193 | A * | 5/1969 | Pagel .......................... | 396/110 |
| 6,404,904 | B1 | 6/2002 | Einighammer et al. | |
| 6,554,452 | B1 * | 4/2003 | Bourn et al. ................. | 362/247 |
| 6,688,523 | B1 * | 2/2004 | Koenck ................. | 235/462.06 |
| 6,850,631 | B1 * | 2/2005 | Oda et al. .................... | 382/117 |
| 7,245,745 | B2 * | 7/2007 | Nagasaka et al. ........... | 382/115 |
| 7,266,223 | B2 * | 9/2007 | Miura et al. ................. | 382/115 |
| 7,340,159 | B2 * | 3/2008 | Sugiura et al. ................ | 396/14 |

(Continued)

FOREIGN PATENT DOCUMENTS

DE    198 18 229 A1    10/1999

(Continued)

OTHER PUBLICATIONS

European Search Report dated Aug. 6, 2007, Application No. 06255595.8—1224.

*Primary Examiner*—Jason Chan
*Assistant Examiner*—Gary C Vieaux
(74) *Attorney, Agent, or Firm*—Westerman, Hattori, Daniels & Adrian, LLP

(57) ABSTRACT

An image capturing apparatus illuminate and captures an image of an object using reflected light from the object. In the apparatus, a plurality of light-emitting devices are mounted in the periphery of an image sensor, and the light of the plurality of light-emitting devices is guided to an image capturing region by a light guide member for illumination. On the image capturing apparatus having the image capturing system disposed close to the illumination system, a hood is provided for optically intercepting the image capturing system from the illumination system, with a flange disposed thereon. The light reflected on the upper face of a filter can be intercepted from being incident on an image capturing system unit. Accordingly, output light not irradiating the object and causing an image capturing noise can be intercepted, which is effective for a clear photographed image.

13 Claims, 17 Drawing Sheets

U.S. PATENT DOCUMENTS

| | | |
|---|---|---|
| 2001/0041073 A1 | 11/2001 | Sorek et al. |
| 2002/0089599 A1 | 7/2002 | Menning |
| 2003/0062413 A1 | 4/2003 | Gardiner et al. |
| 2004/0179723 A1* | 9/2004 | Sano et al. ............... 382/124 |
| 2004/0184641 A1 | 9/2004 | Nagasaka et al. |
| 2005/0057684 A1 | 3/2005 | Tamakoshi |
| 2005/0087601 A1 | 4/2005 | Gerst, III et al. |
| 2006/0018652 A1 | 1/2006 | Sugiura et al. |
| 2006/0203121 A1 | 9/2006 | Kojima |
| 2006/0251408 A1* | 11/2006 | Konno et al. ............... 396/14 |
| 2007/0206114 A1 | 9/2007 | Tanaka et al. |

FOREIGN PATENT DOCUMENTS

| | | |
|---|---|---|
| EP | 1 271 389 A2 | 1/2003 |
| JP | 08320450 A * | 12/1996 |
| JP | 11304583 | 11/1999 |
| JP | 11304583 A * | 11/1999 |
| WO | WO 00/39744 | 7/2000 |
| WO | WO 2004-088588 A1 | 10/2004 |
| WO | WO 2004088590 A1 * | 10/2004 |

* cited by examiner

FIG. 5
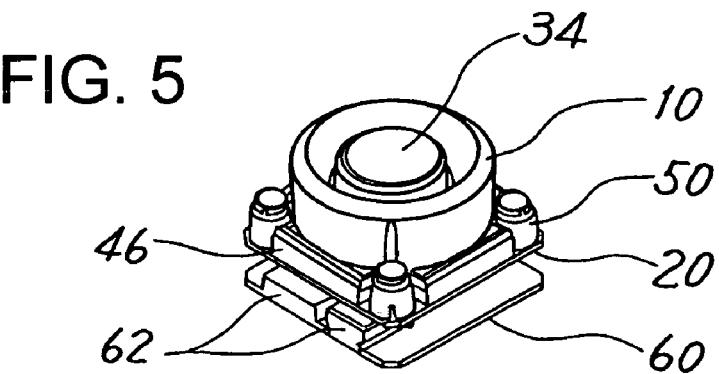
FIG. 6
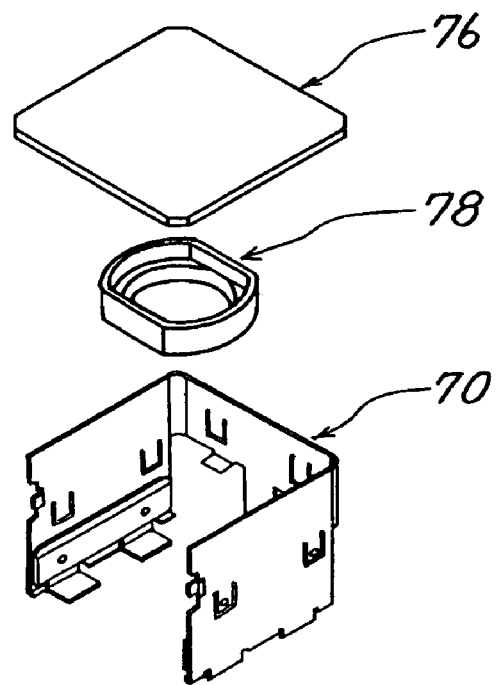
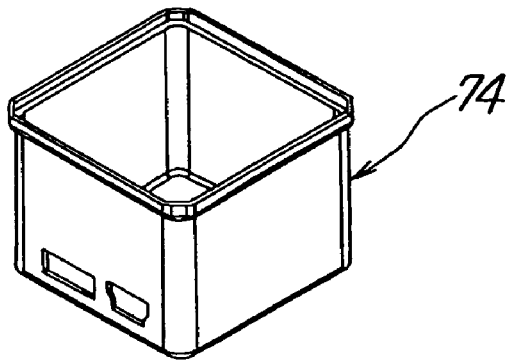

IMAGE CAPTURING FOR CAPTURING AN IMAGE OF AN OBJECT BY ILLUMINATING THE OBJECT AND RECEIVING LIGHT FROM THE OBJECT

CROSS-REFERENCE TO RELATED APPLICATIONS

This application is based upon and claims the benefit of priority from the prior Japanese Patent Application No. 2006-058086, filed on Mar. 3, 2006, the entire contents of which are incorporated herein by reference.

BACKGROUND OF THE INVENTION

1. Field of the Invention

The present invention relates to an image capturing apparatus for guiding light emitted from a light-emitting device to an object, irradiating the object and image capturing the object, and more particularly an image capturing apparatus cutting off the invasion of light to an image capturing unit outside an image capturing range even when disposing the light-emitting device close to the image capturing unit, and obtaining a clear image.

2. Description of the Related Art

An image capturing apparatus for image capturing a predetermined range of an object by irradiating the object with uniform light is widely used. In an image processing system using an image captured by such the image capturing apparatus, a clear image is particularly required.

For example, with the development of biometric technologies in recent years, there have been provided a variety of apparatuses for personal identification, which captures an image of a portion of a human body by which an individual can be distinguished and recognize a characteristic of a living body, for example, fingerprints of limbs, eye retinas, face and blood vessels.

In particular, blood vessels and skin patterns of a palm and a finger are suitable for reliable personal authentication, because a relatively large amount of personal feature data may be obtained therefrom. Further, it is believed that the patterns of blood vessels (veins) do not change from the time of an embryo throughout the lifetime of any person, and that no identical pattern exists among any persons without exception, which are therefore suitable for personal authentication.

For such the biometric authentication or the like, it is necessary to image an object (a portion of a human body in case of the biometric authentication) in a non-contact manner. For this purpose, image capturing apparatus emits light producing uniform light intensity in a certain image capturing range (distance and area), receives the reflected light of the above image capturing range by a sensor, and outputs a captured image signal as an electric signal.

FIGS. 22 and 23 show explanation diagrams of the conventional image capturing apparatus. As shown in FIGS. 22 and 23, image capturing apparatus 100 includes an image capturing (digital camera) unit 120 at the center, and in the periphery thereof, a plurality of light-emitting devices 130-1 to 130-8. The dotted lines shown in FIG. 22 represent the range of the light having uniform intensity emitted from an individual light-emitting device among the plurality of light-emitting devices 130-1 to 130-8.

As such, by disposing a plurality of (here, eight) point light sources in the periphery of image capturing unit 120, the image capturing range of image capturing unit 120 can be irradiated with the light of uniform intensity. Meanwhile, as shown in FIG. 23, the image capturing unit 120 includes a photoelectric conversion unit 122 such as a CMOS sensor, and an optical system 124 such as a lens. Since the photoelectric conversion device 122, which is a plane photodetector device, has a predetermined light receiving area, a predetermined optical distance is required to guide the reflected light of the image capturing range onto the light-receiving plane of the photoelectric conversion device 122. For this purpose, a lens 124 such as a fisheye lens is disposed between the photoelectric conversion unit 122 and the object, so that an image of the predetermined image capturing range is projected onto the light-receiving plane of the photoelectric conversion device 122.

Thus, conventionally, in order to irradiate the object with each point light source element 130-1 to 130-8 by sharing a predetermined image capturing range, the point light source elements 130-1 to 130-8 have been disposed apart from each other, as shown in FIG. 22. Also, in order to supply the light of predetermined uniform intensity to the image capturing range, the point light source elements 130-1 to 130-8 have been disposed closer to the object than the photoelectric conversion device 122, as shown in FIG. 23 (referring to the International Patent Publication No. WO 2004/088588, FIGS. 1 and 6).

In the above conventional image capturing apparatus, as described earlier, the point light source elements 130-1 to 130-8 are disposed apart from each other, and closer to the object than photoelectric conversion device 122, as shown in FIG. 23. Therefore, it is difficult to miniaturize the image capturing apparatus. Also, there is a restriction when incorporating the image capturing apparatus into equipment.

If light-emitting devices which generate high light intensity is used, it becomes possible to dispose the light-emitting device close to the image capturing unit 120. However, the light-emitting device generating high light intensity is expensive and has large power consumption, which is therefore not suitable for a small-sized low-cost image capturing apparatus.

SUMMARY OF THE INVENTION

Accordingly, it is an object of the present invention to provide an image capturing apparatus for supplying spread illumination on an object even when being miniaturized, and preventing invasion of extra light to an image capturing unit.

It is another object of the present invention to provide an image capturing apparatus for supplying spread illumination on an object even when being miniaturized, and realizing satisfactory image capturing.

It is still another object of the present invention to provide an image capturing apparatus preventing penetration of extra light to an image capturing unit even when being miniaturized, supplying spread illumination on an object, and realizing satisfactory image capturing at low cost.

In order to achieve the aforementioned objects, according to the present invention, an image capturing apparatus for capturing an image of an object by illuminating the object and receiving reflected light from the object includes: an image sensor for receiving the reflected light; a plurality of light-emitting devices mounted in the peripheral positions of the image sensor; a light guide member for guiding the light from the plurality of light-emitting devices to an image capturing range and illuminating the image capturing range; an optical unit accommodated inside the light guide member and guiding the reflected light of the object in the illuminated image capturing range to the image sensor; an optical filter disposed on the object side of the optical unit and the light guide member; and a hood optically intercepting the optical unit from the light guide member. And the hood includes a flange for intercepting the light reflected on the optical filter among the light output from the light guide member, from being incident to the optical unit.

Further, according to the present invention, preferably, the plurality of light-emitting devices are mounted on a circuit board at predetermined intervals along a circle in the periphery of the image sensor, and the light guide member is ring-shaped corresponding to the circle.

Further, according to the present invention, preferably, the image sensor and the plurality of light-emitting devices are mounted on an identical circuit board.

Further, according to the present invention, preferably, the hood includes a hood outside wall coupled with the flange and for optically intercepting the optical unit from the light guide member and a hood bottom portion having an aperture so as to set to the optical unit.

Further, according to the present invention, preferably, the image capturing apparatus includes a diffusion plate for diffusing the light of the light-emitting devices, being disposed between the ring-shaped light guide member and the plurality of light-emitting devices.

Further, according to the present invention, preferably, the image capturing apparatus includes a photodetector device for monitoring the light of the light-emitting devices, being disposed between each plurality of light-emitting devices on the circuit board.

Further, according to the present invention, preferably, the image capturing apparatus includes a distance-measuring light-emitting device mounted on the circuit board, for measuring a distance to the object.

Further, according to the present invention, preferably, the plurality of light-emitting devices are constituted of light-emitting devices for emitting infrared light, and the optical filter is constituted of an optical filter filtering visible light.

Further, according to the present invention, preferably, the light guide member includes a lower end portion for introducing the light of the light-emitting devices, an upper end portion for outputting the light to the image capturing range, and a light guide portion for guiding the light of the light-emitting devices from the lower end portion to the upper end portion.

Further, according to the present invention, preferably, the photodetector device is disposed at a lower portion of the light guide member in such a position as to receive the light reflected at the lower portion of the light guide member among the light emitted from the light-emitting devices.

Further, according to the present invention, preferably, the diffusion plate is constituted of a plurality of separate diffusion members, respectively corresponding to the plurality of light-emitting devices which are mounted on the circuit board at predetermined intervals along the circle in the periphery of the image sensor.

Further, according to the present invention, preferably, the distance-measuring light-emitting device is mounted in such a position on the circuit board as to measure the distance to the object in the image capturing range, from the image of the image sensor.

Further, according to the present invention, preferably, the distance-measuring light-emitting device is mounted in an outer position of the light-emitting devices on the circuit board.

Further, according to the present invention, preferably, the image sensor images a portion of a living body.

According to the present invention, in an image capturing apparatus having an image capturing system disposed close to an illumination system, including a plurality of light-emitting devices mounted in the periphery of an image sensor, and guiding the light of the plurality of light-emitting devices to an image capturing region by a light guide member, thereby supplying illumination, a hood is provided for optically intercepting the image capturing system from the illumination system, with a flange provided thereon. Thus, the light reflected on the upper face of a filter can also be intercepted from being incident on an image capturing system unit. Accordingly, output light not irradiating the object and causing an image capturing noise can be intercepted, which is effective for obtaining a clear photographed image.

Further scopes and features of the present invention will become more apparent by the following description of the embodiments with the accompanied drawings.

BRIEF DESCRIPTION OF THE DRAWINGS

FIG. 5 shows an assembly diagram of the components shown in FIG. 2.

FIG. 6 shows a configuration diagram of the external finishing components shown in FIG. 1.

DETAILED DESCRIPTION OF THE PREFERRED EMBODIMENTS

The preferred embodiment of the present invention is described hereinafter referring to the charts and drawings, in the order of an image capturing apparatus configuration, an illumination mechanism, a hood configuration, an image capturing processing configuration, and other embodiments. However, it is to be noted that the scope of the present invention is not limited to the embodiments described below.

Image Capturing Apparatus

Figure 1:
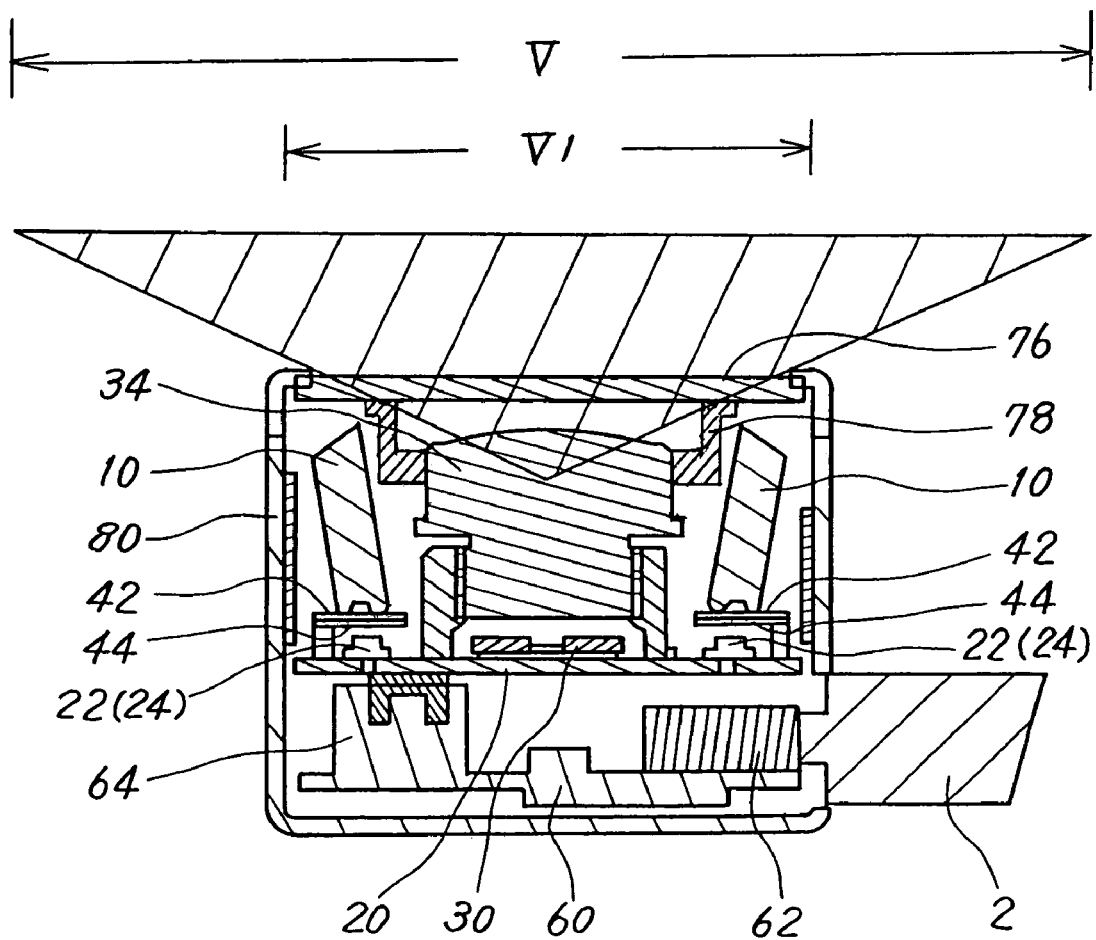
FIG. 1 shows a cross-sectional view of an image capturing apparatus according to one embodiment of the present invention.
Figure 2:
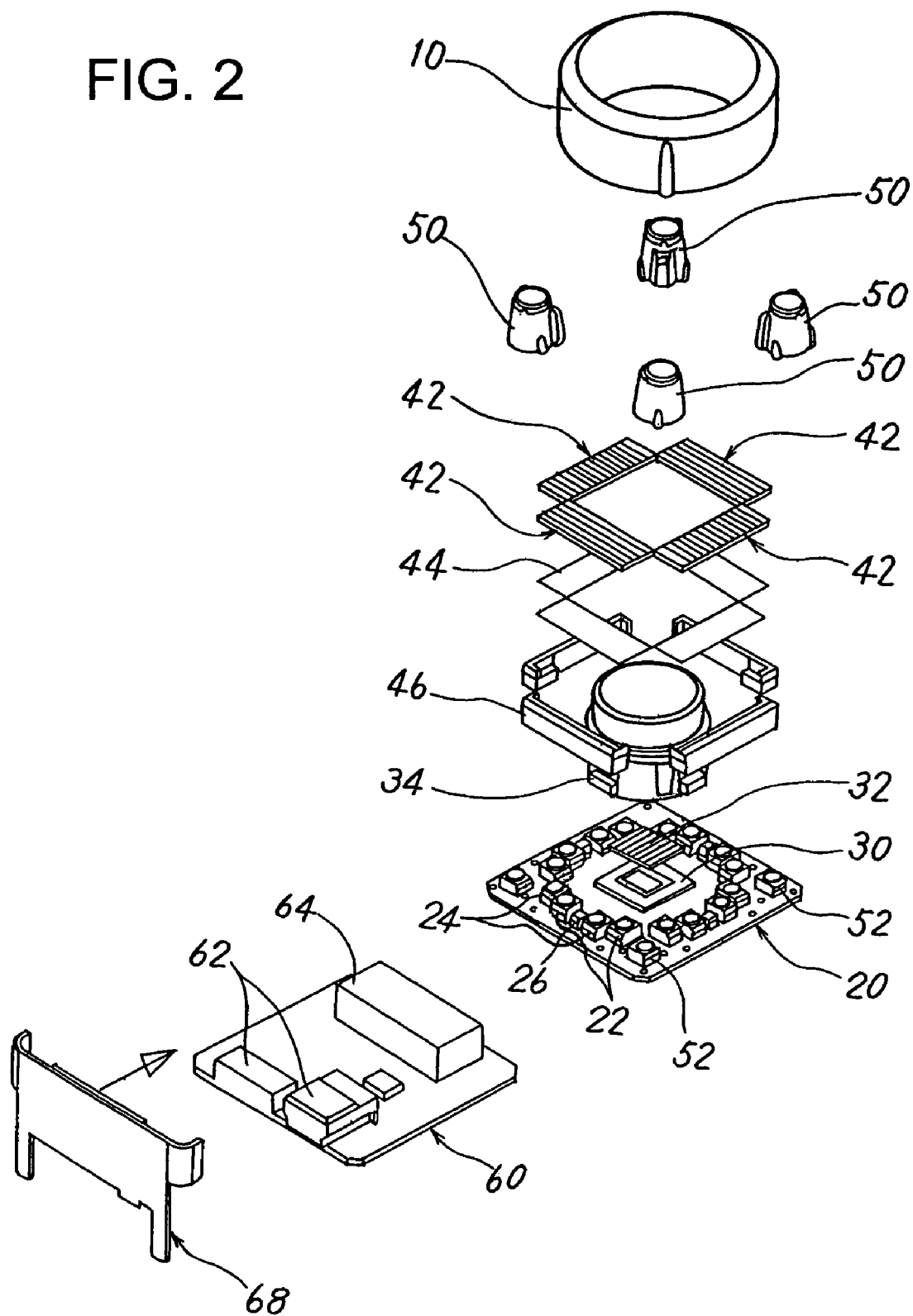
FIG. 2 shows an exploded structural view of the image capturing apparatus shown in FIG. 1.
Figure 3:
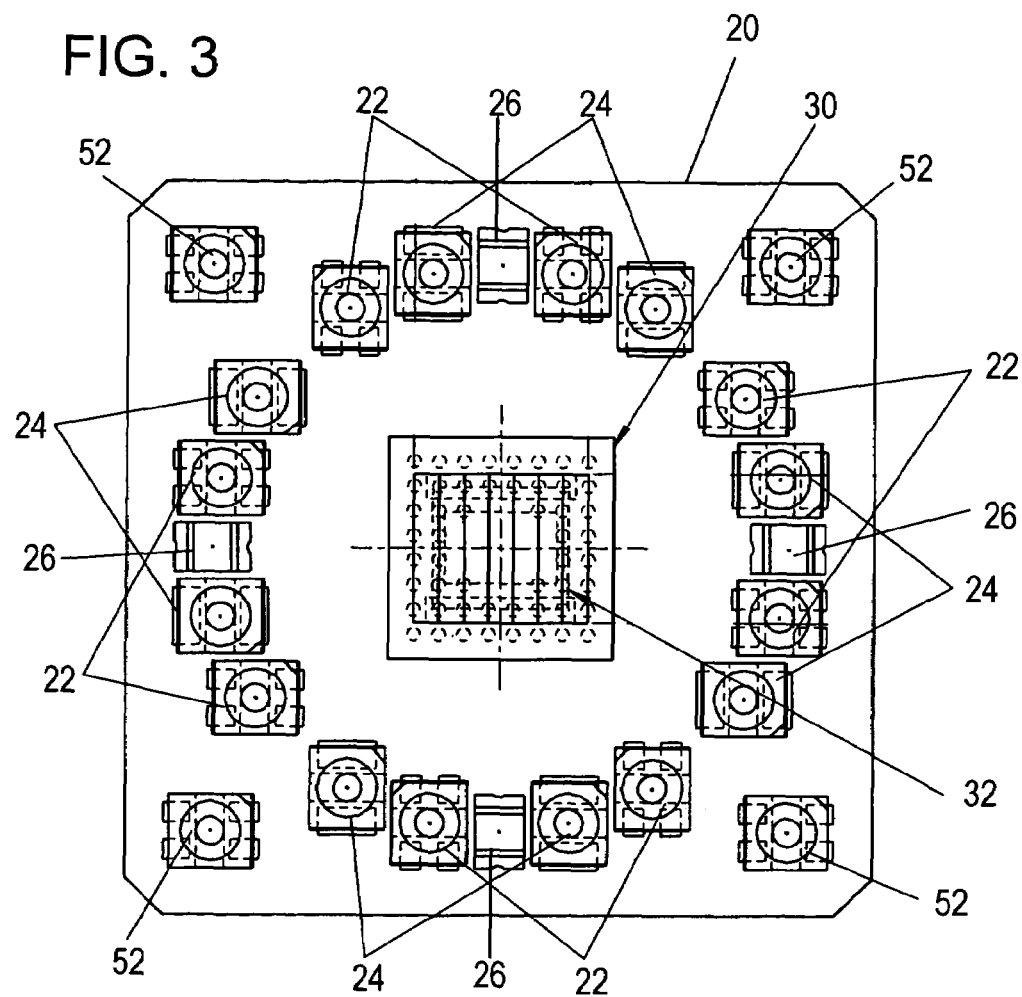
FIG. 3 shows a component layout diagram of the circuit board shown in FIG. 2.
Figure 4:
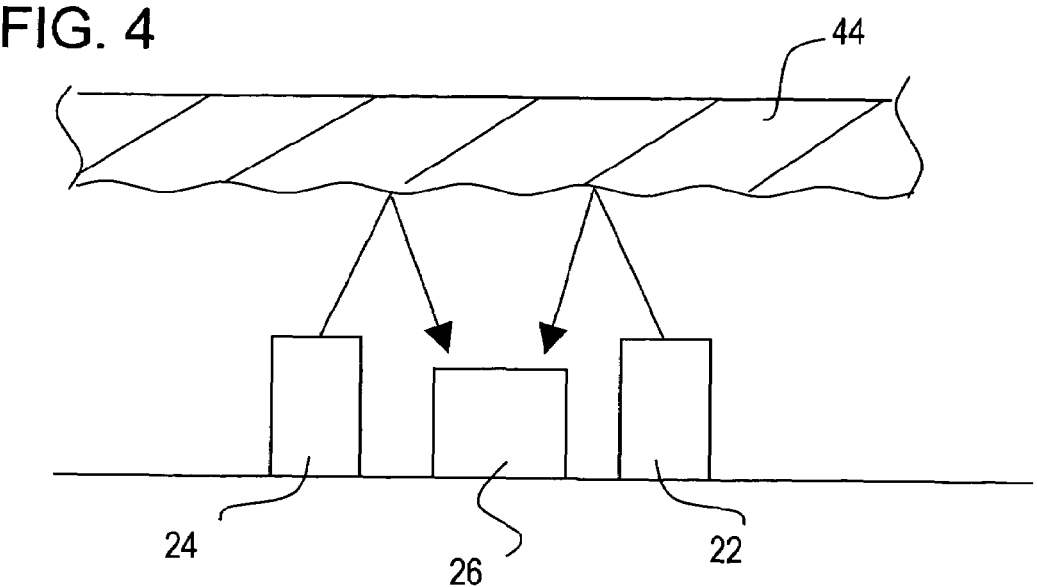
FIG. 4 shows an explanation diagram of the relationship between a light-emitting device and a photodetector device shown in FIG. 2.
Figure 7:
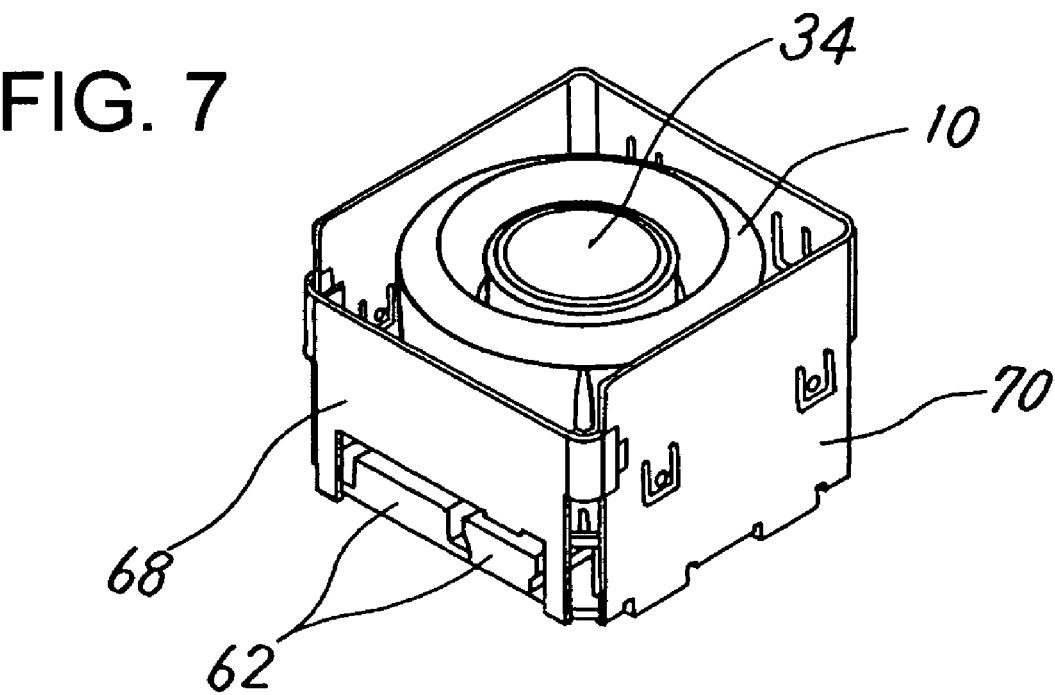
FIG. 7 shows a configuration diagram of the assembly of the assembled body shown in FIG. 2.
Figure 8:
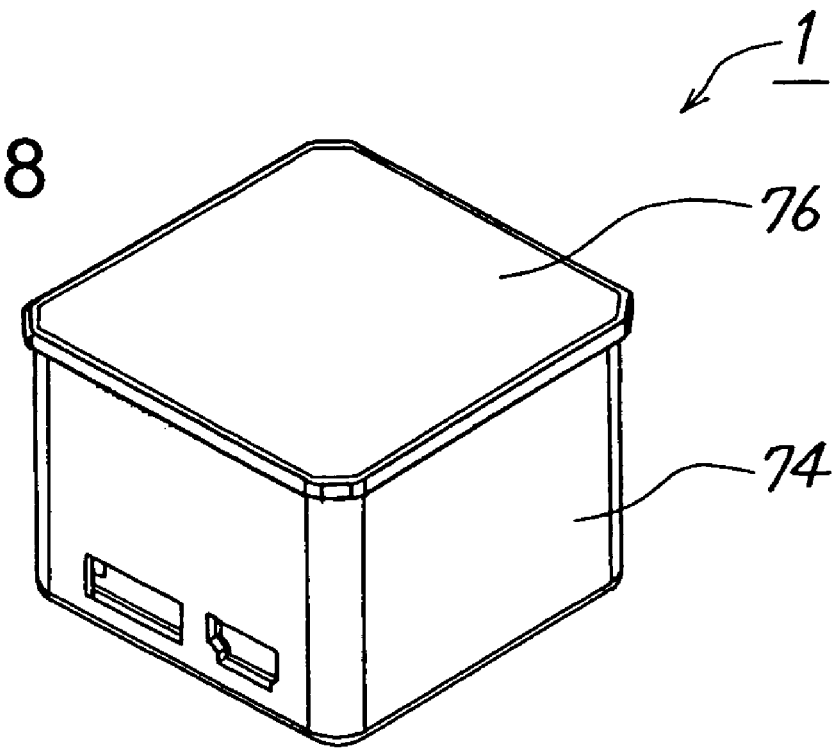
FIG. 8 shows an outer view of the image capturing apparatus shown in FIG. 1.

FIG. 1 shows a cross-sectional view of an image capturing apparatus according to one embodiment of the present invention; FIG. 2 shows an exploded structural view of the image capturing apparatus shown in FIG. 1; FIG. 3 shows a top plan view of the circuit board shown in FIGS. 1 and 2; FIG. 4 shows an operation explanation diagram of a light-emitting device and a photodetector device shown in FIG. 3; FIG. 5 shows an assembly diagram when the structures shown in FIG. 2 are assembled; FIG. 6 shows a configuration diagram of the external case shown in FIG. 1; FIG. 7 shows a configuration diagram when the assembled body shown in FIG. 2 is housed in the external case; and FIG. 8 shows an outer view of the image capturing apparatus shown in FIG. 1.

Prior to the description of the configuration shown in FIG. 1, referring to FIGS. 2 through 7, the configuration of each portion illustrated in FIG. 1 is described. As shown in FIG. 2, an image sensor 30 such as a CMOS image sensor and a polarizing plate 32 are disposed at the center of a camera substrate 20. In the periphery of the image sensor 30 of the camera substrate 20, a plurality of light-emitting devices 22 and 24 and photodetector devices 26 are mounted.

Describing in more detail with reference to FIG. 3, the image sensor 30 is mounted at the center of the camera substrate 20, and the polarizing plate 32 is pasted upon the image sensor 30. Along the circle in the periphery of the image sensor 30 of the camera substrate 20, a plurality of light-emitting devices 22 and 24 and the photo-detector devices 26 are mounted.

Between each the above first light-emitting device 22 and each the second light-emitting device 24, the photo-detector device (photodiode) 26 is disposed. As shown in FIG. 4, the above photodetector device 26 is provided for receiving the light from both the first light-emitting device 22 and the light from the second light-emitting device 24 (reflected light from a diffusion plate 44 described later), thereby performing APC (automatic power control) of the first light-emitting device 22 and the second light-emitting device 24.

The above first light-emitting device 22 and the second light-emitting device 24 are driven for emission at individual timing.

In the above example, in order to independently perform automatic power control of each the first and second light-emitting device 22, 24, which emits light at individual timing, one photodetector device 26 is disposed between the first light-emitting device 22 and the second light-emitting device 24 so as to receive the light from the first and second light-emitting devices 22, 24. Thus, the number of photodetector devices for APC control can be reduced.

Further, at the four corners of the camera substrate 20, four distance-measuring light-emitting devices 52 are provided for measuring the distance to the object. As shown in FIG. 3, the above four distance-measuring light-emitting devices 52 are disposed on the diagonal lines of the camera substrate 20, at the farthest positions on the diagonal lines so that each distance therebetween becomes farthest. From the distances measured by the above four distance-measuring light-emitting devices 52, the inclination of the object (here, palm) is detected.

In brief, on a single camera substrate 20, there are provided illumination system 22, 24 and 26 and image capturing system 30 and 32 for image capturing the object, as well as a distance-measuring system 52.

Now, referring back to FIG. 2, in the upper direction of the light-emitting devices 22 and 24 of the camera substrate 20, there are provided four diffusion plates 44 and four polarizing plates 42. The above diffusion plates 44 and polarizing plates 42 are respectively pasted onto polarization/diffusion plate mount tables 46 being attached on the four sides of the camera substrate 20. Each diffusion plate 44 diffuses, to a certain extent, the emission distribution of the directive light emitted from the first and second light-emitting devices 22 and 24. Each polarizing plate 42 converts natural light emitted from the first and second light-emitting devices 22, 24 to linearly polarized light.

In the upper direction of the four polarizing plates 42, a ring-shaped light guide member 10 is provided. The light guide member 10 is formed of, for example, resin, and guides the light from the first and second light-emitting devices 22 and 24 of the camera substrate 20 in the upward direction, so as to irradiate the object with uniform light. To fit the dispositions of the light-emitting devices 22 and 24 of the camera substrate 20, the light guide member 10 has a ring-shaped structure. As will be described in FIG. 9 and after, the light guide member 10 guides the light emitted from the first and second light-emitting devices 22 and 24 to the upward direction, so that the object is irradiated with uniform light.

Further, an optical unit 34 is attached to the camera substrate 20 on the image sensor 30 disposed in the approximate center of the camera substrate 20, and inside the ring-shaped light guide member 10. The optical unit 34 is constituted of a lens optical system such as a converging lens.

An aperture 50 is mounted on the distance-measuring light-emitting device 52 of the camera substrate 20. The aperture 50 shuts off diffusion of light to other directions so as to guide the light emitted from the distance-measuring light-emitting devices 52 to the object direction.

Separately from the camera substrate 20, a control substrate 60 is provided. The control substrate 60 is provided for connecting with the outside, and includes an external connector 62 and a camera connector 64 for connecting with the camera substrate 20. The above control substrate 60 is disposed on the lower portion of the camera substrate 20, and electrically connected with the camera substrate 20 using the camera connector 64. Further, a holder cover 68 is provided for the external connector 62.

In such a way, the image sensor 30, the light-emitting devices 22 and 24, the photo-detector devices 26 and the distance-measuring light-emitting devices 52 are mounted on the camera substrate 20. Also, the polarization/diffusion plate mount tables 46, the diffusion plates 44, the polarizing plates 42, the apertures 50, the optical unit 34, and the light guide members 10 are mounted on the above camera substrate 20, and thus a camera portion is assembled. To the above camera portion, the control substrate 60 is attached. FIG. 5 shows a state of the unit after attaching the camera portion and the control substrate.

Further, as shown in FIG. 6, there are prepared a visible-light cutoff filter plate 76, a hood 78, a holder assembly 70 and an external case 74. By attaching attachment unit shown in FIG. 5 to the holder assembly 70 shown in FIG. 6, and also, by attaching the holder cover 68 shown in FIG. 2 to the holder assembly 70, the configuration shown in FIG. 7 is assembled.

The configuration shown in FIG. 7 is then housed into the external case 74 shown in FIG. 6, and by attaching the visible-light cutoff filter plate 76 having an attached hood 78 on the upper portion of the external case 74, an image capturing apparatus shown in FIG. 8 is structured. The above visible-light cutoff filter plate 76 cuts off the visible light component so as not to enter the image sensor 30 from outside. Further, as also described below referring to FIG. 1, the hood 78 cuts off the light so that the light outside the predetermined image capturing area does not enter the optical unit 34, and prevents the light being leaked from the light guide member 10 from invading into the optical unit 34.

FIG. 1 shows a cross-sectional view of the finished body 1 shown in FIG. 8. As described earlier, the image sensor 30, the light-emitting devices 22, 24, the photo-detector devices 26 and the distance-measuring light-emitting device 52 are mounted on the camera substrate 20. Namely, a basic structure including the illumination system and the image capturing system is mounted on the single substrate. Accordingly, only one mounting board is sufficient, thus contributing to cost reduction.

Also, with the provision of ring-shaped light guide member 10 on the upper portion of the light-emitting devices 22 and 24, the light from the light-emitting devices 22 and 24 is guided to the visible-light filter 76. The above light guide member 10 separates the light from the light-emitting devices 22 and 24 and then forwards the light to the visible-light filter 76. Therefore, the light-emitting devices 22 and 24 can be disposed close to the image sensor 30, and also on the identical substrate 20, which enables miniaturization, and illumination of the object by uniform light as well. More specifically, assuming that an oblique line portion of an upside-down triangle shape shown in FIG. 1 is the image capturing range of the camera, the image capturing range can be illuminated by uniform light.

Further, because the light guide member 10 has a ring shape, it is possible to house the optical unit 34 inside the ring 10, thus enabling further miniaturization. In addition, the hood 78 prevents the light outside the predetermined image capturing range (oblique line portion in FIG. 1) from entering the optical unit 34, and also prevents the light leaked from the light guide member 10 from invading into the optical unit 34. Accordingly, even when the light guide member 10 and the light-emitting devices 22 and 24 are disposed close to the image sensor 30 and the optical unit 34, degradation in image capturing accuracy can be avoided.

Moreover, since the distance-measuring light-emitting devices 52 are provided on the camera substrate 20, it becomes possible to further miniaturize the camera unit measuring the distance. Additionally, in FIG. 1, the control substrate 60 is connected to the lower portion of the camera substrate 20, and an external cable 2 is connected to the external connector 62 of the control substrate 60.

Illumination Mechanism

Figure 9:
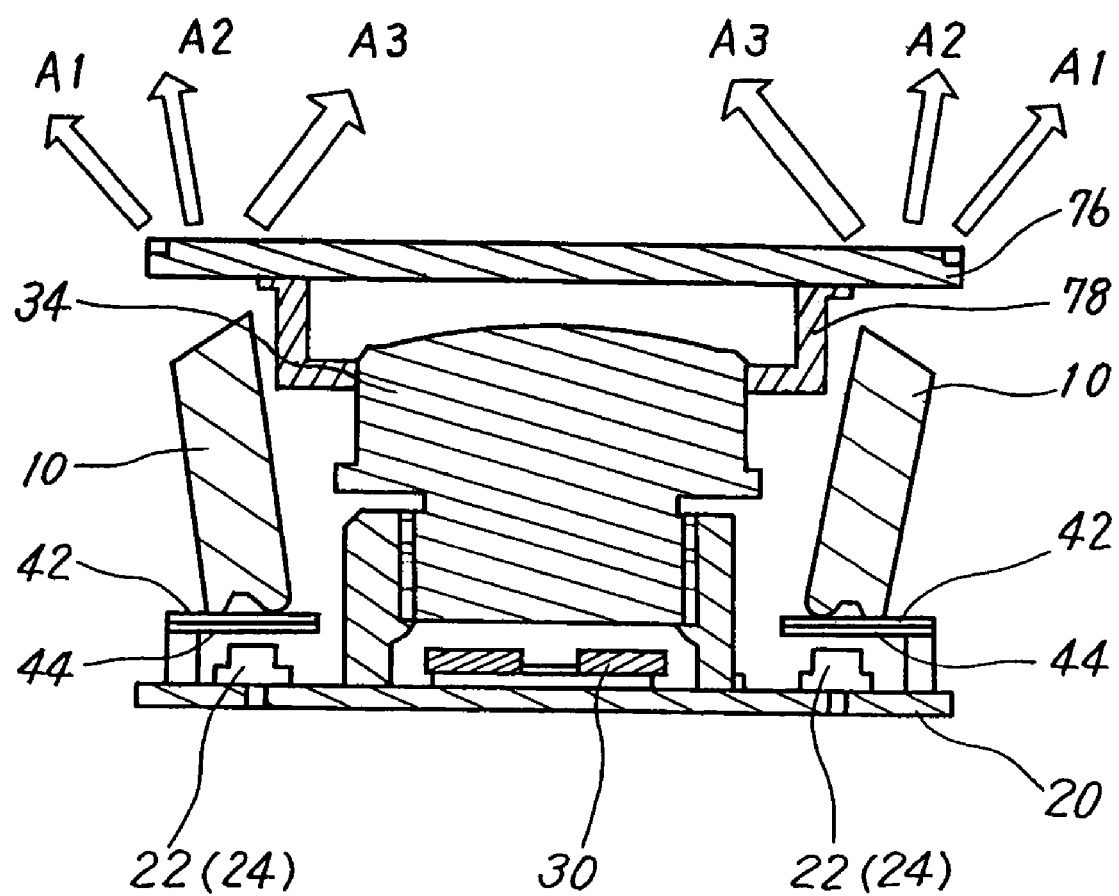
FIG. 9 shows an explanation diagram of the illumination system shown in FIG. 1.
Figure 10:
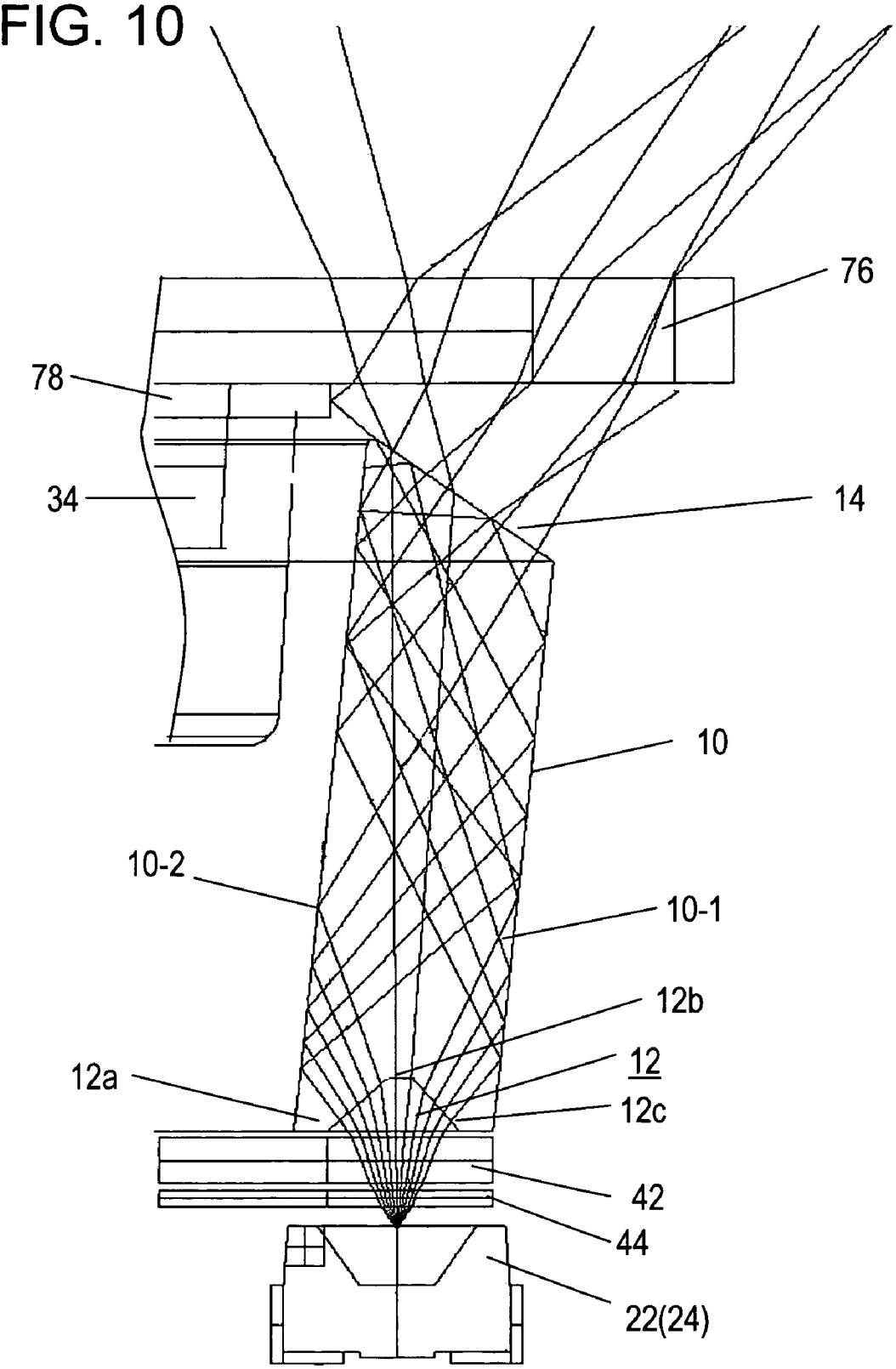
FIG. 10 shows a configuration diagram of the light guide member and the light-emitting device shown in FIG. 9.
Figure 11:
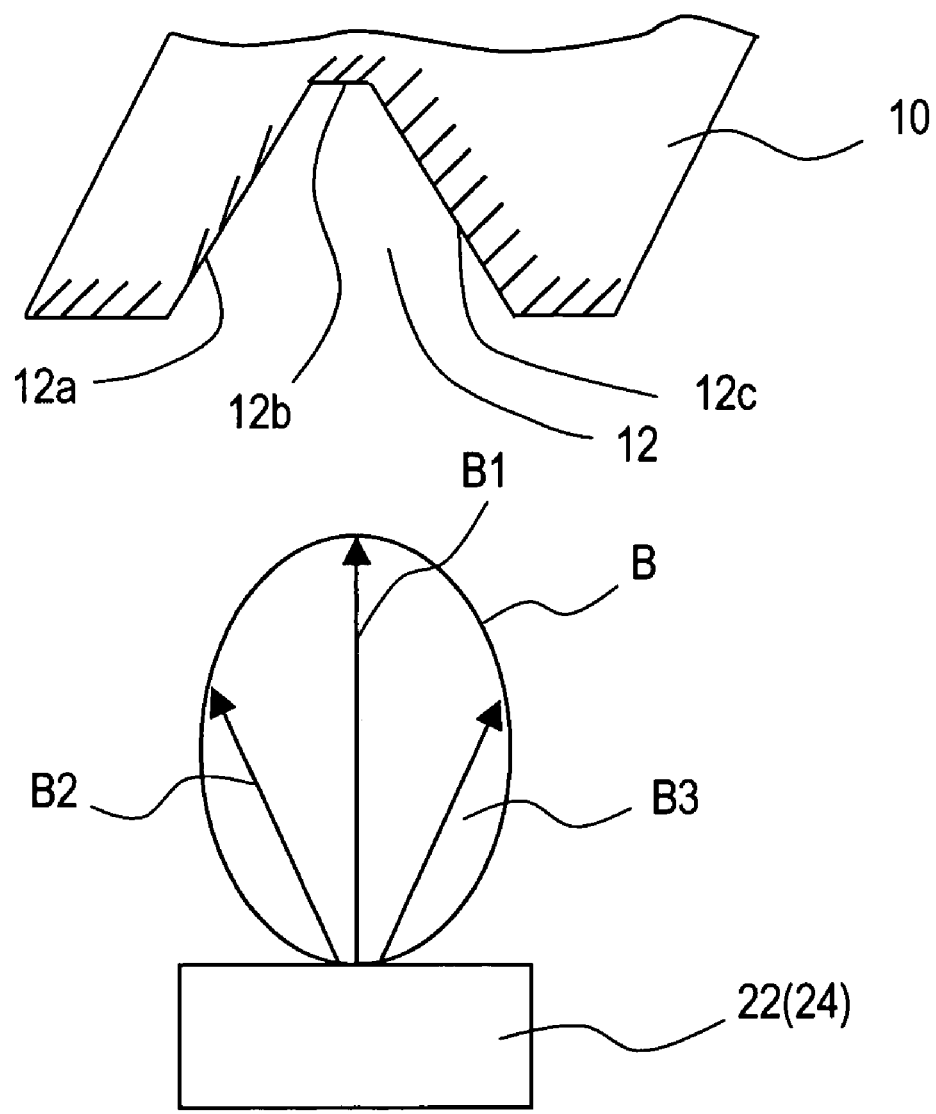
FIG. 11 shows a relation diagram of the emission intensity distribution of the light-emitting device, and the lower end portion of the light guide member shown in FIG. 10.
Figure 12:
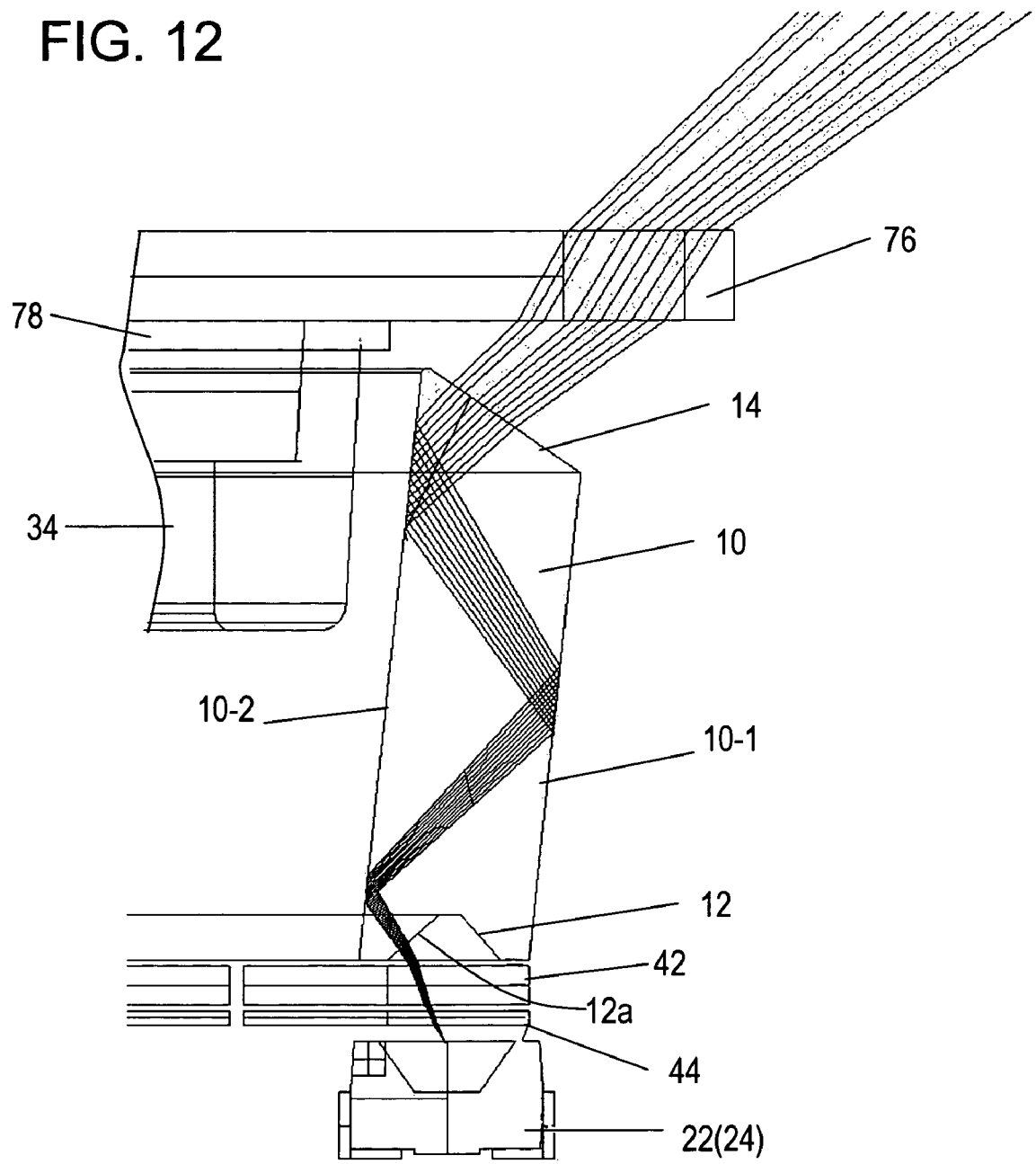
FIG. 12 shows a first operation explanation diagram of the light guide member shown in FIG. 10.
Figure 13:
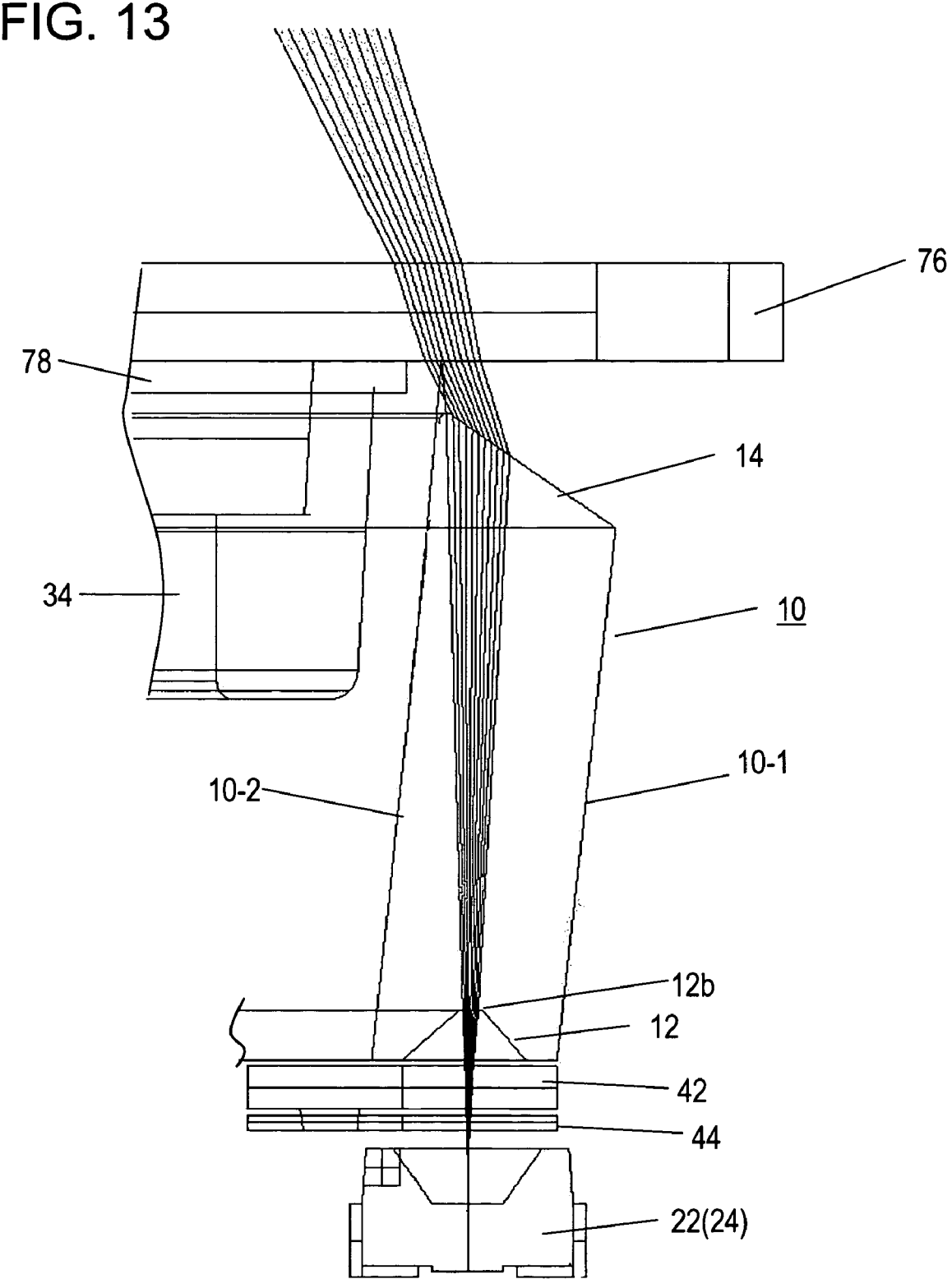
FIG. 13 shows a second operation explanation diagram of the light guide member shown in FIG. 10.
Figure 14:
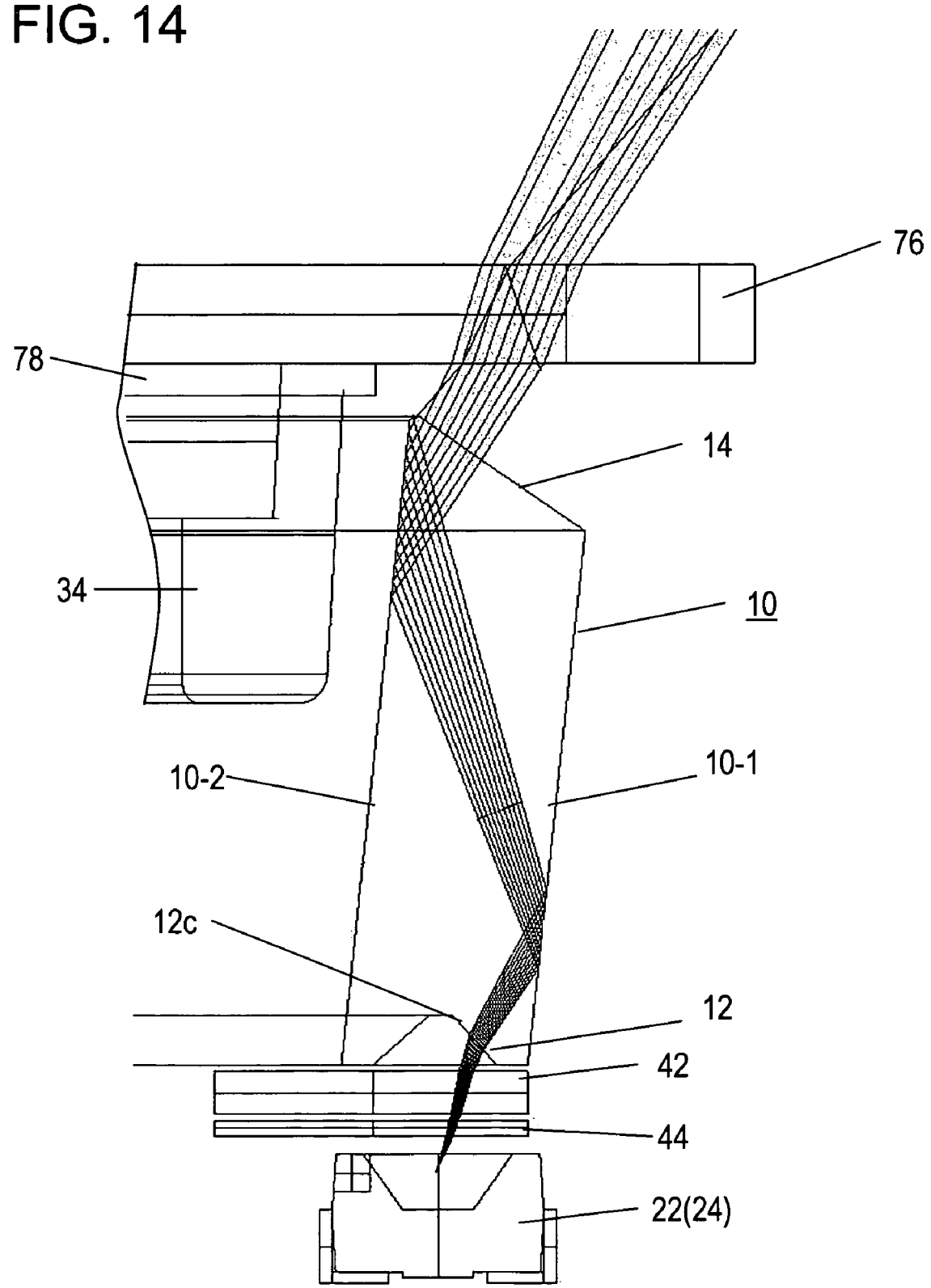
FIG. 14 shows a third operation explanation diagram of the light guide member shown in FIG. 10.
Figure 15:
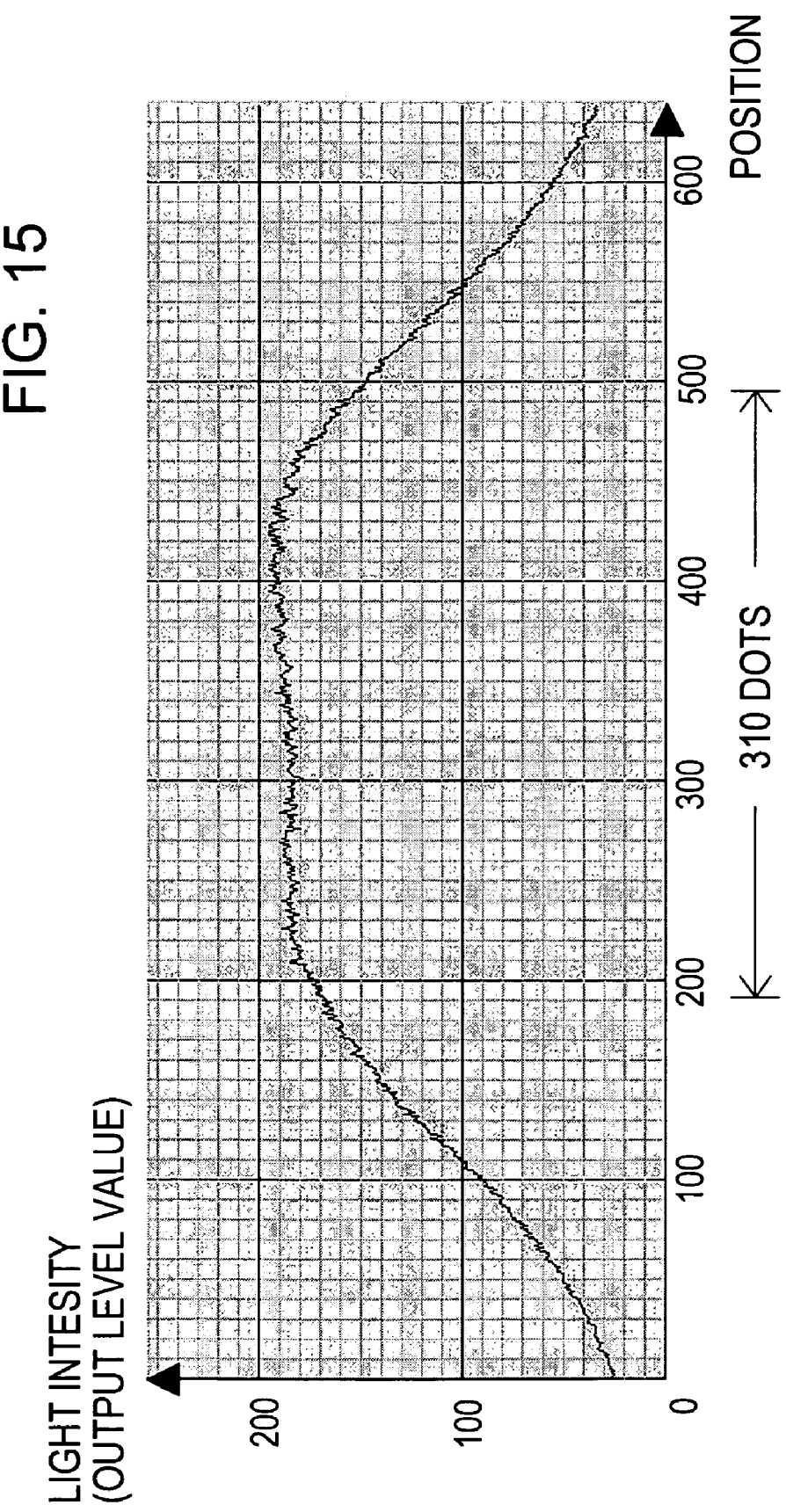
FIG. 15 shows a light intensity distribution diagram using the light guide member shown in FIG. 10.

Next, an illumination mechanism including a light guide member will be described. FIG. 9 shows an operation explanation diagram of the light guide member according to one embodiment of the present invention; FIG. 10 shows a detailed configuration diagram of the illumination mechanism shown in FIG. 9; FIG. 11 shows an explanation diagram of a trapezoidal notch of the light guide member shown in FIG. 10; FIGS. 12 through 14 show explanation diagrams of light guiding and diffusion operations of the light guide member shown in FIG. 10; and FIG. 15 shows a luminance distribution diagram by the illumination.

In FIG. 9, like parts as shown in FIGS. 1 and 2 are designated by like reference numerals. As shown in FIG. 9, the light guide member 10 guides the light from each light-emitting device 22 and 24, which is a point light source, to the visible-light filter 76 so that the light is split into three.

More specifically, from the light guide member 10, basically, light A3 to the direction of the optical unit 34, light A2 to the longitudinal direction of the light guide member 10, and light A1 to the opposite direction to the optical unit 34 are output. With the provision of the above light guide member 10, each single point light source 22 and 24 can behave as if three point light sources exist in the vicinity of the visible-light filter 76.

As shown in FIG. 10, the light guide member 10 includes an upper slope face 14, two side-faces 10-1, 10-2, and a lower trapezoidal groove 12. The lower trapezoidal portion 12 is positioned opposite to the light-emitting device 22 and 24 by the intermediary of the polarizing plate 42 and the diffusion plate 44, and receives the light from the light-emitting device 22 and 24. Also, the upper slope face 14 is a slope face of which height is greater on the optical unit 34 side.

As shown in FIG. 11, an emission intensity distribution B from the light-emitting device 22 and 24 has a long (strong) circular arc shape in the upward direction. Namely, the intensity of a light component B1 to the light output direction of the light-emitting device 22 and 24 (vertical direction of the device) is stronger than the intensity of light components B2, B3 to the directions to both sides. As shown in FIG. 9, the trapezoidal groove 12 of the light guide member 10 is formed correspondingly to the above intensity distribution B so that the light can basically be regarded as three point light sources on the output side.

More specifically, in order to function as three point light sources by the reflection inside the light guide member 10, the trapezoidal groove 12 is constituted of a flat portion 12b for introducing the light component B1, and a pair of slope face portions 12a and 12c for introducing the light components B2, B3 on the both sides, having gradients corresponding to the directions of the light components B2, B3. The above shapes of the trapezoidal groove 12 function to split the light from each point light source 22, 24 into three.

Also, as described later, the respective lengths of the above flat portion 12b and slope face portions 12a, 12c are set so that the light intensity in a predetermined area caused by the light output from the light guide member 10 becomes substantially uniform. Here, the length of the flat portion 12b, which receives the maximum intensity of the light component B1, is set shorter than each length of the slope face portions 12a, 12c, which receive light intensity of the light components B2, B3 weaker than the light intensity of the light component B1. By this, depending on the light intensity distribution, the split light amount is adjusted.

The above operation is described referring to FIGS. 12 through 14. As shown in FIG. 12, the component B2 on the left side of the emission intensity distribution B of each light-emitting device 22, 24 is incident to the left side face 10-2 of the light guide member 10, from the left slope face portion 12a of the light guide member 10. The incident light is then reflected on the left side face 10-2, and forwarded to the right side face 10-1 of the light guide member 10. Subsequently, the light forwarded to the right side face 10-1 is reflected on the right side face 10-1, and forwarded again to the left side face 10-2. The light is then reflected on the left side face 10-2 and incident to the upper slope face 14 substantially perpendicularly, and output to the outermost portion of the image capturing range.

Also, as shown in FIG. 13, the central component B1 of the emission intensity distribution B of the light-emitting device 22 and 24 is incident to the light guide member 10 from the central flat portion 12b of the light guide member 10. The light is then incident obliquely to the upper slope face 14, and output to the innermost portion of the image capturing range.

Further, as shown in FIG. 14, the component B3 on the right side of the emission intensity distribution B of the light-emitting device 22, 24 is incident to the right side face 10-1 of the light guide member 10, from the right slope face portion 12c of the light guide member 10. The incident light is then reflected on the right side face 10-1, and forwarded to the left side face 10-2 of the light guide member 10. Subsequently, the light forwarded to the left side face 10-2 is reflected on the left side face 10-2, and incident to the upper slope face 14 substantially perpendicularly, and output between the innermost portion and the outermost portion of the image capturing range.

By synthesizing FIGS. 12 through 14, an optical path diagram as shown in FIG. 10 is obtained. Namely, by the trapezoidal groove 12, the light guide member 10 splits the point emission of the point light source 22, 24 into three. Using the reflection on the side faces inside the light guide member 10, each split light is output in such behavior as three point light sources existent on the output side of the light guide member 10.

In this case, considering the image capturing range (shown by oblique lines) shown in FIG. 1, the output direction is adjusted at the upper slope face 14 of the light guide member 10. Also, in order to obtain substantially uniform light intensity in the image capturing range, the lengths i.e. the incident widths of, or the incident amount to, flat portion 12b and slope face portions 12a, 12c of the trapezoidal groove 12 of the light guide member 10 are adjusted, taking into consideration the emission intensity distribution B of the light-emitting device 22, 24 described earlier in FIG. 11.

Here, to obtain the substantially uniform light intensity, because the emission intensity distribution B of the light-emitting device 22 and 24 described in FIG. 11 has stronger light intensity at the center, while weaker light intensity in the periphery, the length of the flat portion 12b of the trapezoidal groove 12 of the light guide member 10 is set smaller than each length of the slope face portions 12a, 12c. Thus, it is structured that the light portion having strong light intensity is incident not only to the flat portion 12b, but also to the slope face portions 12a, 12c.

Also, using the groove 12 having a trapezoidal shape and the upper slope face 14 of the light guide member 10, and the reflection by the light guide member 10, the reflected light and the rectilinear light can be output with diffusion so as to obtain substantially uniform light intensity throughout the image capturing range.

FIG. 15 shows a diagram illustrating an experiment result in regard to the image capturing range and the light intensity of the image capturing apparatus shown in FIG. 1. In FIG. 15, the horizontal axis indicates the position, while the vertical axis indicates the light intensity. More specifically, the position is a dot position of the image sensor 30, and here, the image sensor 30 having 640 dots in width is employed. By placing white plain paper for experimental purpose on the flat portion of the upper part of the image capturing range (oblique line portion) shown in FIG. 1, thereby producing uniform reflection, an output level value of each dot of the image sensor 30 has been measured. Because of the white plain paper, the output level value corresponds to the light intensity.

According to the above example of the experiment result, substantially uniform light intensity has been obtained in the width of approximately 310 dots in the center of image sensor 30. For example, the maximum level in the 310 dot width is '190', the minimum level is '160', which range within ±15% of the medium value '175', with the error of ±10% or less.

When describing with reference to FIG. 1, for an image capturing range V of image sensor 30, the range of uniform light intensity is shown by V1. Although the image capturing range is V, by extracting particularly important features of the image capturing object from an image in the above range V1, feature extraction can be made with high accuracy. Further, by matching the level through level correction, the image outside the range V1 can be used for feature extraction of lower importance.

Hood Configuration

Figure 16:
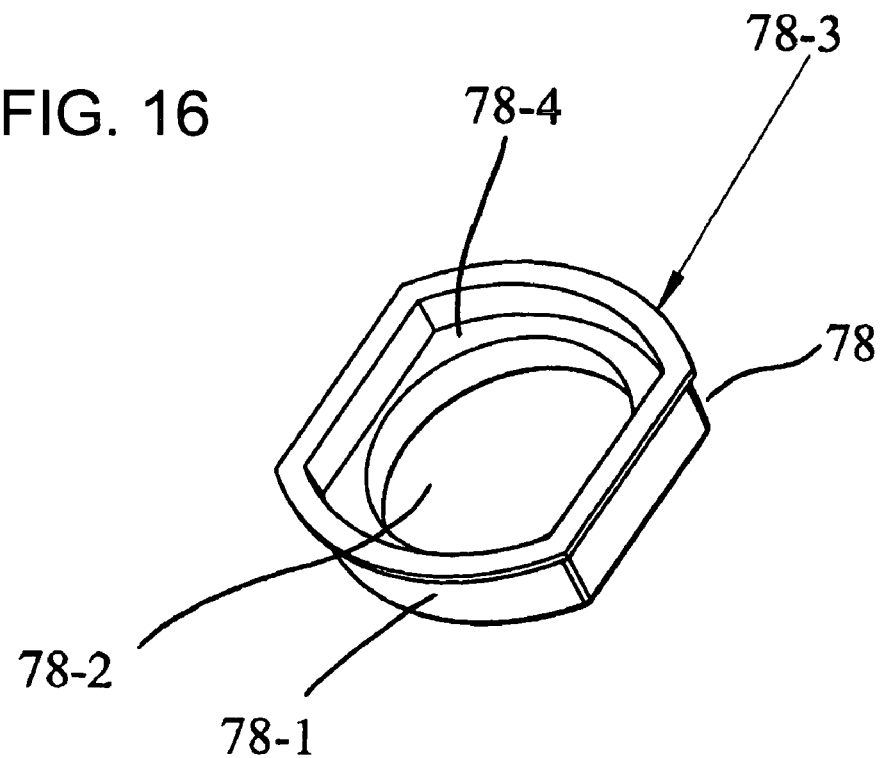
FIG. 16 shows a perspective diagram of the hood shown in FIG. 1, viewed from an upper face side.
Figure 17:
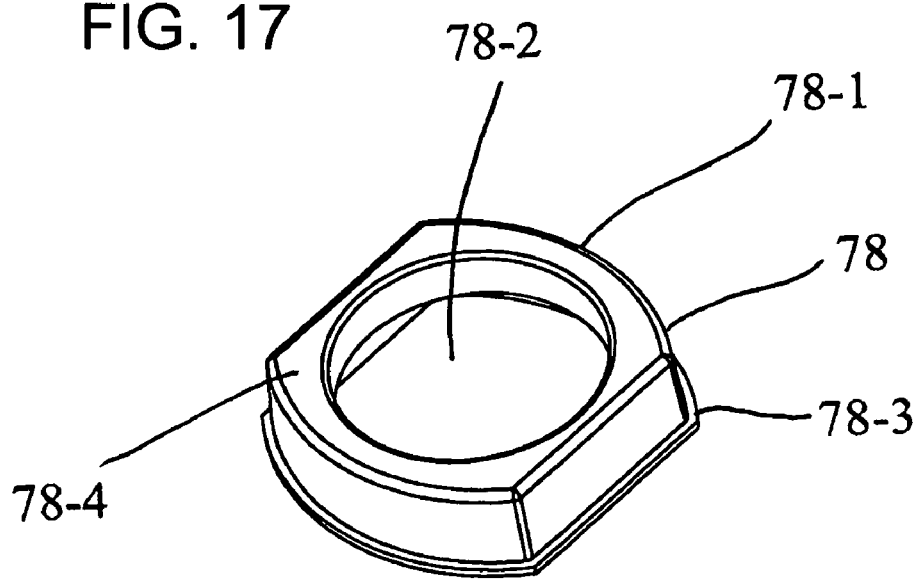
FIG. 17 shows a perspective diagram of the hood shown in FIG. 16, viewed from a lower face side.

FIGS. 16 and 17 show configuration diagrams of the hood of the image capturing apparatus described in FIGS. 1 through 14, and FIG. 18 shows an operation explanation diagram thereof. FIG. 16 is a perspective diagram of the hood viewed from above, while FIG. 17 is a perspective diagram of the hood viewed from below. As shown in FIGS. 16 and 17, the hood 78 includes a hood outside wall 78-1, a bottom portion 78-4 of the hood outside wall 78-1, an exposure hole 78-2 disposed on the bottom portion 78-4, and a flange 78-3 disposed on the uppermost portion of the hood outside wall 78-1.

Figure 18:
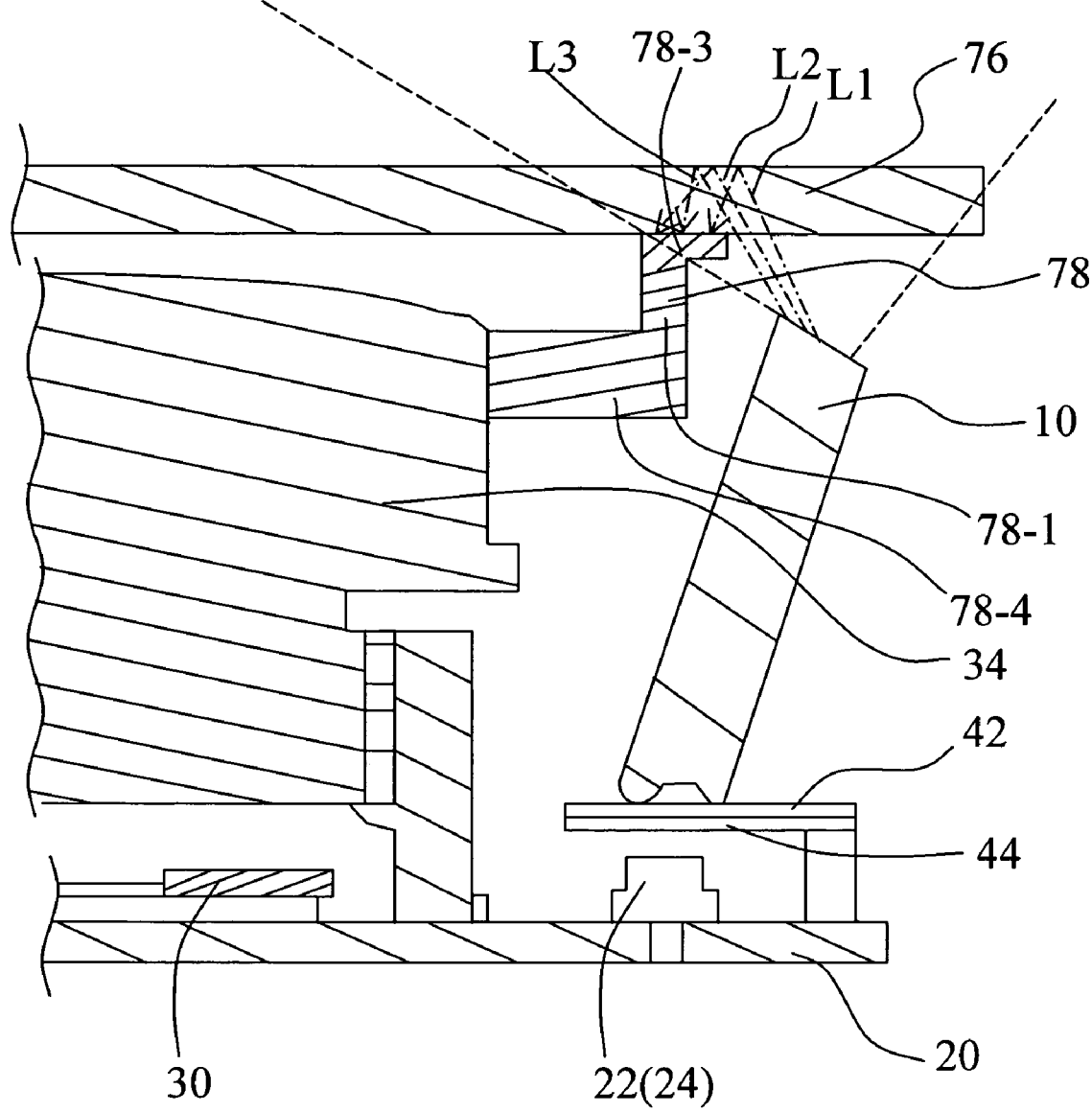
FIG. 18 shows an operation diagram of the hood shown in FIGS. 16 and 17.

As shown in FIG. 18, a top of optical unit 34 is set in the exposure hole 78-2 produced on the bottom portion 78-4 of the hood 78. The upper portion of the hood 78 (including the flange 78-3) is fitted to the visible-light filter 76. As having been described in FIGS. 1 through 14, when image capturing unit 34, 30 and illumination mechanism 22, 10 are disposed close to each other for the purpose of miniaturization, the light from the illumination mechanism, a light output system, is incident to the image capturing system 34, 30, which affects the photographed image.

Therefore, it is necessary to optically separate the light output system from the image capturing system. For this purpose, the hood 78 is provided. The above hood 78 is formed of a screening member which does not transmit light. With the provision of the bottom portion 78-4, the hood outside wall 78-1 is positioned in the direction of the light guide member 10. The hood outside wall 78-1 disposed substantially perpendicularly screens the light which may either be directly incident from the light guide member 10 or reflected on the lower face of the visible-light filter 76 so as not to be incident to the image capturing unit 34, 30. Also, as shown in FIG. 1, the hood outside wall 78-1 restricts the incident range of the reflected light from the object, as shown by the oblique lines in FIG. 1.

Further, the flange 78-3 disposed on the upper portion of the hood outside wall 78-1 extends to the direction of the light guide member 10. As shown in FIG. 18, the flange 78-3 intercepts reflected light L1, L2, L3, which is reflected on the upper face of the visible-light filter 76 among the light output from the light guide member 10, from being incident to the image capturing unit 34, 30. Such the reflected light L1, L2, L3 causes image capturing noise because of not irradiating the object. Therefore, interception by means of the flange 78-3 is effective to obtain a clear photographed image.

As such, the hood 78 cuts off light so as to prevent the light outside the predetermined image capturing range (shown by the oblique lines in FIG. 1) from entering the optical unit 34, and also prevent the light, which does not contribute to the irradiation on the object among the light output from the light guide member 10, from invading into the optical unit 34.

Image Processing Configuration

Figure 19:
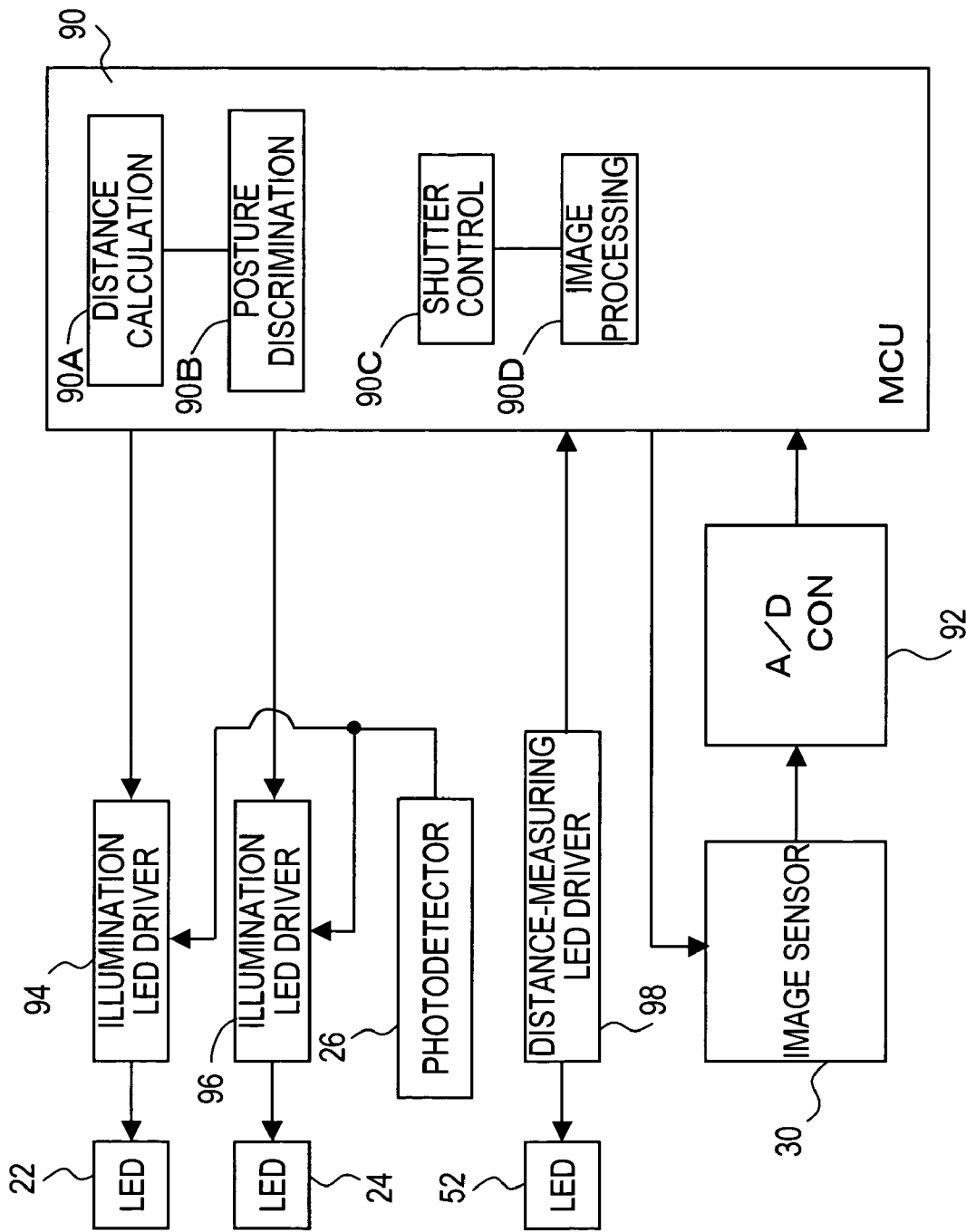
FIG. 19 shows a block diagram of a control circuit for the image capturing apparatus shown in FIG. 1.
Figure 20:
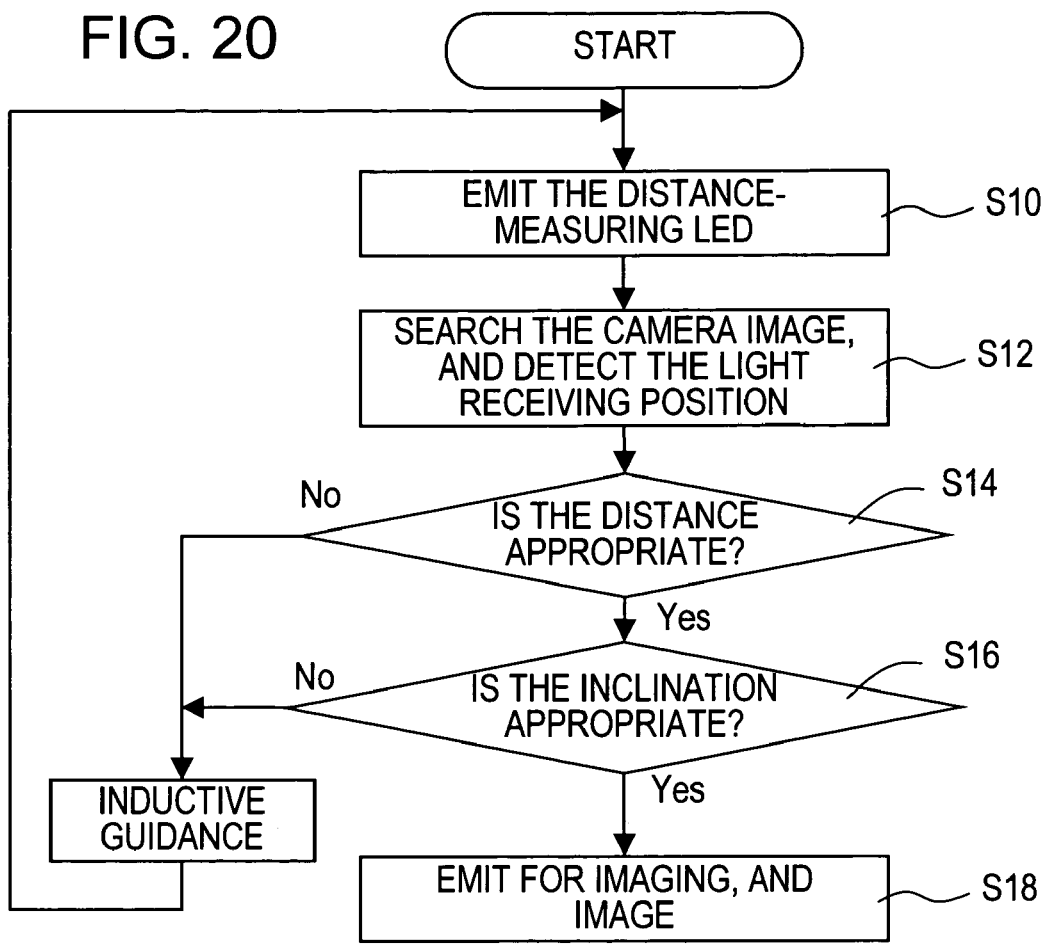
FIG. 20 shows an image capturing process flowchart of the control circuit shown in FIG. 19.
Figure 21:
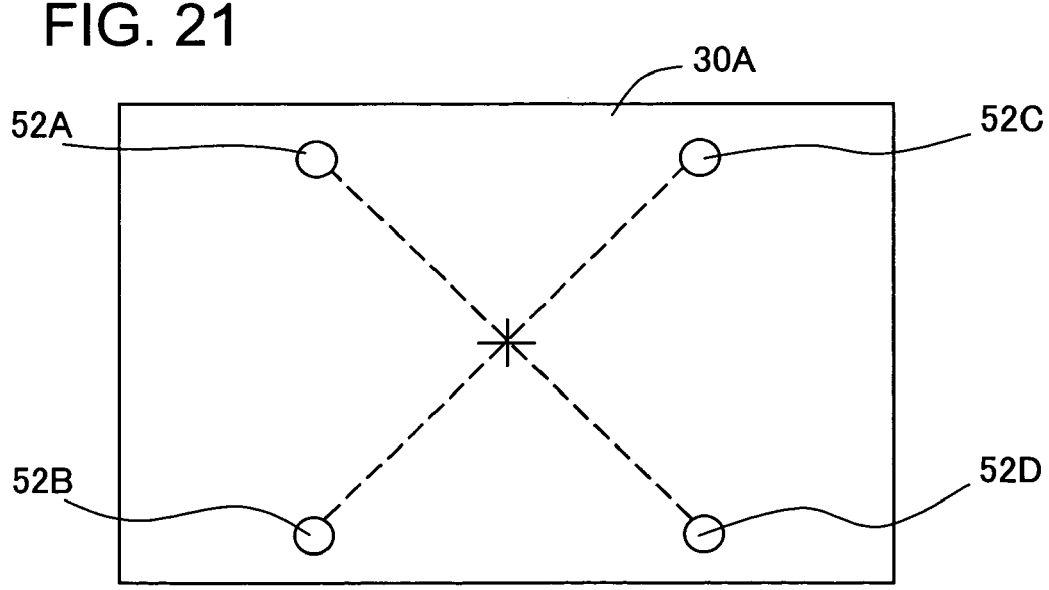
FIG. 21 shows an explanation diagram of the distance measurement operation using the configuration shown in FIG. 19.
Figure 22:
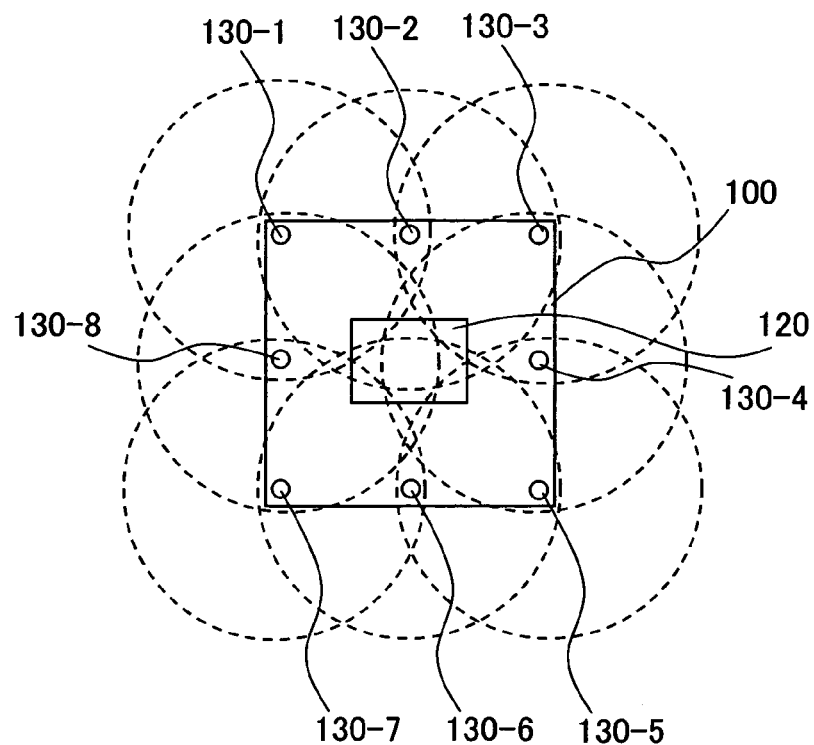
FIG. 22 shows an explanation diagram of the illumination configuration in the conventional image capturing apparatus.
Figure 23:
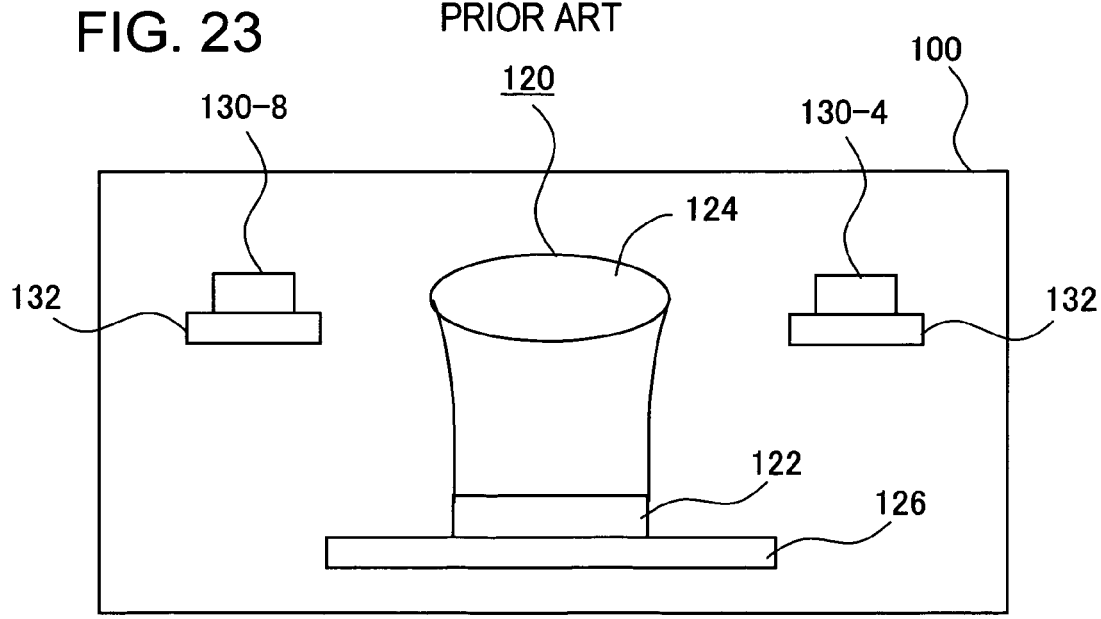
FIG. 23 shows a configuration diagram of the conventional image capturing apparatus.

FIG. 19 shows a block diagram of an captured image processing apparatus according to one embodiment of the present invention. FIG. 20 shows a flowchart of the captured image processing in the above image processing apparatus. Also, FIG. 21 shows an explanation diagram of distance measurement operation.

As shown in FIG. 19, a drive/process system in the image capturing apparatus includes a first illumination LED driver 94 for driving the first light-emitting device 22, a second illumination LED driver 96 for driving the second light-emitting device 24, a distance-measuring LED driver 98 for driving the distance-measuring light-emitting devices 52, an analog/digital converter 92 for converting the analog output of each pixel from the image sensor 30 to a digital value, and a microcontroller 90.

As described in FIG. 4, the first and second illumination LED drivers 94, 96 perform APC (automatic power control) in each light emission period, according to the light intensity received in the photo-detector device 26. Microcontroller (MCU) 90 includes MPU (microprocessor), ROM (read-only memory) and RAM (random access memory), and executes processing including distance measurement 90A, posture discrimination 90B, shutter control 90C and image processing 90D.

Referring to FIG. 20, image capturing processing in MCU 90 is described below.

(S10) MCU 90 drives the distance-measuring light-emitting devices (LED) 52 via the distance-measuring LED driver 98. By this, four distance-measuring light-emitting devices 52 described in FIGS. 2 and 3 emit light. As shown in FIG. 1, the image sensor 30 photographs an image in the image capturing range. Here, since the illumination light-emitting devices 22, 24 are not driven, the image sensor 30 receives only the reflected light from the object in the image capturing range corresponding to the light emitted from the distance-measuring light-emitting devices 52. In FIG. 21, there are shown the positions of the reflected light 52A, 52B, 52C and 52D in an image 30A of the image sensor 30, being received from the object in the image capturing range corresponding to the light emitted from each distance-measuring light-emitting device 52. The above positions deviate depending on the inclination of the object (for example, palm).

(S12) Next, by means of analog/digital (A/D) converter 92, each analog light reception amount in image 30A of the image sensor 30 is converted into a digital value, and then stored into the memory of MCU 90. MCU 90 searches the image data in the memory, and detects the positions of the above reflected light 52A, 52B, 52C and 52D.

At this time, since the four distance-measuring light-emitting devices 52 are disposed diagonally from the center of the image (image capturing range) as shown in FIGS. 3 and 21, by searching on the straight lines, as shown by the dotted lines in FIG. 21, the positions of the four points can be detected from the pixel luminance on the straight lines. Further, because the light-emitting devices 52 are disposed in the farthest positions on the diagonal lines with sufficient distances, it is possible to detect the positions far from the center in the image. From the above four positions, MCU 90 detects the distance and the inclination of the object using the triangulation measuring method. Namely, by use of the positions from the center of the image sensor 30, a distance at each of the four points is calculated, and the inclination (in four directions) can be detected from the distance difference of the four points.

(S14) MCU 90 decides whether the distance to the image capturing object is appropriate (whether the object is positioned in the image capturing range with a predetermined focal distance). When the distance to the image capturing object is not appropriate, MCU 90 displays a guidance message on a non-illustrated display portion. For example, a guidance message of "Put the object (palm) closer." or "Put the object (palm) further." is displayed.

(S16) When the distance is appropriate, MCU 90 decides whether the inclination of the image capturing object is appropriate. For example, when capturing an image of a flat portion (palm, etc.) of the object, it is decided whether the inclination is within a tolerable range. When the inclination of the image capturing object is not appropriate, MCU 90 displays a guidance message on the non-illustrated display portion. For example, in case that a palm is the object, a guidance message of "Open your hand." or the like is displayed.

(S18) When the inclination is appropriate, MCU 90 instructs the illumination LED drivers 94, 96 to emit light. Thus, the first and second light-emitting devices 22, 24 emit light, so as to irradiate the object. Subsequently, MCU 90 drives a non-illustrated electronic shutter (in the optical unit), and photographs the image in the image capturing range. MCU 90 then stores the image into the memory via A/D converter 92.

Then, the feature is extracted from the above image. For example, in case of extraction of the aforementioned blood vessel image, the blood vessel image is extracted from the image.

As such, the image sensor 30 is also used for the distance-measuring photodetector portion to detect whether the image capturing object lies at the focal distance, or the inclination thereof. Thus, in the distance measurement mechanism, it is sufficient to provide the distance-measuring light-emitting devices 52 without particularly providing photodetector devices for distance measurement. This contributes to a reduction of cost, and miniaturization as well, due to a reduced number of mounting components.

Also, because four distance-measuring light-emitting devices 52 are disposed diagonally from the center of the image (image capturing range), the positions of the four points can be detected by searching the image data stored in the memory as shown by the dotted lines in FIG. 21, and thus, detection processing becomes easy. Further, because distance-measuring light-emitting devices 52 are disposed in the farthest positions on the diagonal lines with sufficient distances, it is possible to detect the positions in the image farthest from the center even the apparatus is miniaturized, and detection of the inclination can be performed accurately.

Other Embodiments

In the aforementioned embodiments, the image capturing object is exemplified by the palm, and the image processing of the image capturing object is exemplified by the vein pattern authentication. However, the present invention is also applicable to other biometric authentication by use of other features of human bodies, including hand skin pattern, blood vessel image of the back of hand, blood vessel image of a finger, features of face and iris, etc. Also, the present invention is not limited to the application to the biometric authentication, but applicable to other applications.

Further, the number of distance-measuring light-emitting devices is not limited to four, but any plurality may be chosen.

The foregoing description of the embodiments is not intended to limit the invention to the particular details of the examples illustrated. Any suitable modification and equivalents may be resorted to the scope of the invention. All features and advantages of the invention which fall within the scope of the invention a recovered by the appended claims.

What is claimed is:

1. An image capturing apparatus for capturing an image of an object by illuminating the object and receiving reflected light from the object, comprising:
    an image sensor for receiving the reflected light;
    a plurality of light-emitting devices mounted on a circuit board, on which is also mounted said image sensor at peripheral positions of the image sensor;
    a light guide member for guiding light emitted from the plurality of light-emitting devices to an image capturing range, and illuminating the image capturing range;
    an optical unit accommodated inside the light guide member and for guiding the reflected light of the object in the illuminated image capturing range to the image sensor;
    an optical filter disposed on the object side of the optical unit and the light guide member; and
    a hood for optically intercepting the optical unit from the light guide member,
    wherein said hood further comprises a flange for intercepting the light reflected on the optical filter among the light output from the light guide member, from being incident to the optical unit, wherein the light guide member comprises:
    a lower end portion for introducing the light of light-emitting devices;
    an upper end portion for outputting the light to the image capturing range; and
    a light guide portion for guiding the light of the light-emitting devices from the lower end portion to the upper end portion,
    wherein an upper portion of the hood is contacted to said optical filter.

2. The image capturing apparatus according to claim 1, wherein the plurality of light-emitting devices are mounted on a circuit board at predetermined intervals along a circle in the periphery of the image sensor, and
    wherein the light guide member comprises a ring-shaped configuration corresponding to the circle.

3. The image capturing apparatus according to claim 2, further comprising a diffusion plate for diffusing the light of the light-emitting devices, and disposed between the ring-shaped light guide member and the plurality of light-emitting devices.

4. The image capturing apparatus according to claim 3, wherein the diffusion plate comprises a plurality of separate diffusion members, respectively corresponding to the plurality of light-emitting devices which are mounted on the circuit board at predetermined intervals along the circle in the periphery of the image sensor.

5. The image capturing apparatus according to claim 2, further comprising a distance-measuring light-emitting device mounted on the circuit board and for measuring a distance to the object.

6. The image capturing apparatus according to claim 5, wherein the distance-measuring light-emitting device is mounted in such a position on the circuit board as to measure the distance to the object in the image capturing range using the image of the image sensor.

7. The image capturing apparatus according to claim 6, wherein the distance-measuring light-emitting device is mounted on the circuit board in an outer position of the light-emitting devices.

8. The image capturing apparatus according to claim 1, wherein the image sensor and the plurality of light-emitting devices are mounted on an identical circuit board.

9. The image capturing apparatus according to claim 8, further comprising a photo-detector device for monitoring the light of the light-emitting devices, and disposed between each plurality of light-emitting devices on the circuit board.

10. The image capturing apparatus according to claim 1, wherein the hood comprises:
    a hood outside wall coupled with said flange and for optically intercepting the optical unit from the light guide member; and
    a hood bottom portion having an aperture for setting to the optical unit.

11. The image capturing apparatus according to claim 1, wherein the plurality of light-emitting devices comprise light-emitting devices for emitting infrared light, and wherein the optical filter comprises an optical filter filtering visible light.

12. The image capturing apparatus according to claim 1, wherein the image sensor captures an image of a portion of a living body.

13. An image capturing apparatus for capturing an image of an object by illuminating the object and receiving reflected light from the object, comprising:
    an image sensor for receiving the reflected light,
    a plurality of light-emitting devices mounted on a circuit board, on which is also mounted said image sensor at peripheral positions of the image sensor;
    a light guide member for guiding light emitted from the plurality of light-emitting devices to an image capturing range, and illuminating the image capturing range;
    an optical unit accommodated inside the light guide member and for guiding the reflected light of the object in the illuminated image capturing range to the image sensor;
    an optical filter disposed on the object side of the optical unit and the light guide member; and
    a hood for optically intercepting the optical unit from the light guide member,
    wherein said hood further comprises a flange for intercepting the light reflected on the optical filter among the light output from the light guide member, from being incident to the optical unit,
    wherein the image sensor and the plurality of light-emitting devices are mounted on an identical circuit board,
    said image capturing apparatus further comprising a photo-detector device for monitoring the light of the light-emitting devices, and disposed between each plurality of light-emitting devices on the circuit board,
    wherein the photo-detector device is disposed at a lower portion of the light guide member in such a position as to receive the light reflected at the lower portion of the light guide member among the light emitted from the light-emitting devices.

* * * * *